United States Patent
Adair et al.

(10) Patent No.: US 10,019,489 B1
(45) Date of Patent: Jul. 10, 2018

(54) INDIRECT FEEDBACK SYSTEMS AND METHODS

(71) Applicant: Amazon Technologies, Inc., Seattle, WA (US)

(72) Inventors: Brian Lafayette Adair, San Jose, CA (US); Joshua Seth Levy, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 266 days.

(21) Appl. No.: 15/140,341

(22) Filed: Apr. 27, 2016

(51) Int. Cl.
G06F 17/30 (2006.01)
G06Q 30/06 (2012.01)
G06K 9/00 (2006.01)

(52) U.S. Cl.
CPC ...... *G06F 17/3053* (2013.01); *G06F 17/3028* (2013.01); *G06K 9/00288* (2013.01); *G06K 9/00302* (2013.01); *G06K 9/00362* (2013.01); *G06Q 30/0631* (2013.01)

(58) Field of Classification Search
CPC ............ G06F 17/3053; G06F 17/3028; G06K 9/00288; G06K 9/00302; G06K 9/00362
USPC ...................................................... 707/723
See application file for complete search history.

(56) References Cited

U.S. PATENT DOCUMENTS

| 7,472,077 B2 | 12/2008 | Roseman et al. |
| 7,685,074 B2 | 3/2010 | Linden et al. |
| 8,122,020 B1 | 2/2012 | Donsbach et al. |
| 8,538,986 B2 * | 9/2013 | Bogart .............. G06F 17/30265 707/749 |
| 9,460,557 B1 * | 10/2016 | Tran ........................ G06T 19/20 |
| 2008/0005091 A1 * | 1/2008 | Lawler .............. G06F 17/30592 |
| 2011/0016001 A1 * | 1/2011 | Schieffelin ........... A61B 5/0059 705/14.66 |
| 2011/0026835 A1 * | 2/2011 | Ptucha .............. G06F 17/30247 382/209 |
| 2012/0259240 A1 | 10/2012 | Llewellynn |
| 2013/0152506 A1 * | 6/2013 | Pradeep ............. G06Q 30/0268 53/411 |
| 2015/0371260 A1 * | 12/2015 | Chan .................. G06Q 30/0253 705/14.51 |

FOREIGN PATENT DOCUMENTS

WO WO 2011/045422 4/2011

OTHER PUBLICATIONS

Brave, Scott, et al., "Emotion in Human-Computer Interaction", CHI 2005, Portland. OR, Apr. 2-7, 2005, 16 pages.*

(Continued)

*Primary Examiner* — Robert Stevens
(74) *Attorney, Agent, or Firm* — Knobbe Martens Olson & Bear LLP

(57) ABSTRACT

Features are disclosed for identifying indirect user feedback and providing content such as item descriptions based on the indirect user feedback. An indirect feedback system may receive sensed data such as images or audio and identify indicators of indirect feedback for the subject shown, heard, or otherwise detected in the sensed data. For example, a user's facial expression and/or body language can provide indirect feedback as to how the user is feeling (e.g., mood). Based on the detected mood, features for suggesting additional items that should appeal to the user are described.

26 Claims, 9 Drawing Sheets

(56) References Cited

OTHER PUBLICATIONS

Nvsio Sa, "nViso Announces Availability of Plug-in-Play Real-time 3D Facial Imaging API for measuring emotion reactions online" (Nov. 9, 2012), 2 pages.
Zeng et al., "A Survey of Affect Recognition Methods: Audio, Visual and Spontaneous Expressions" ICMI'07 (Nov. 12-15, 2007, Nagoya, Aichi, Japan), 8 pages.

* cited by examiner

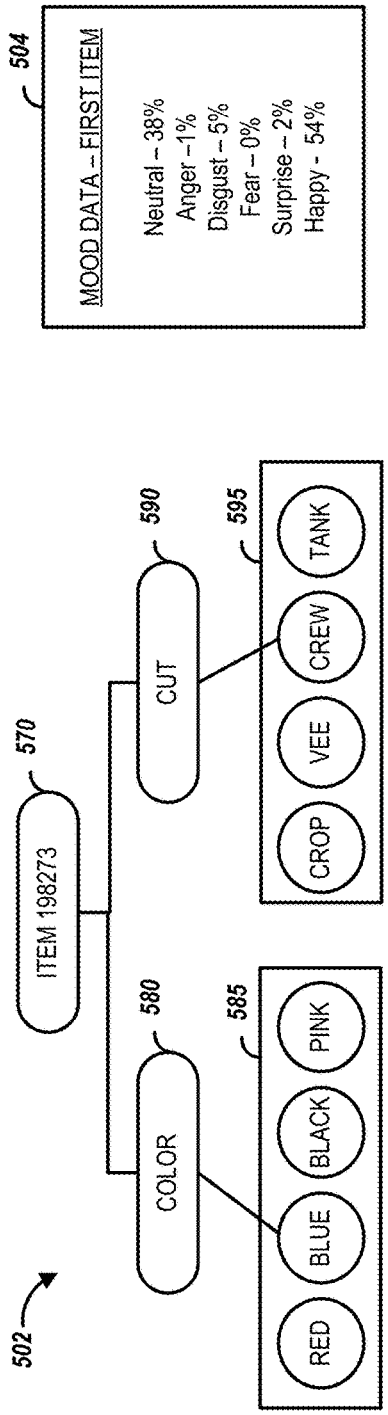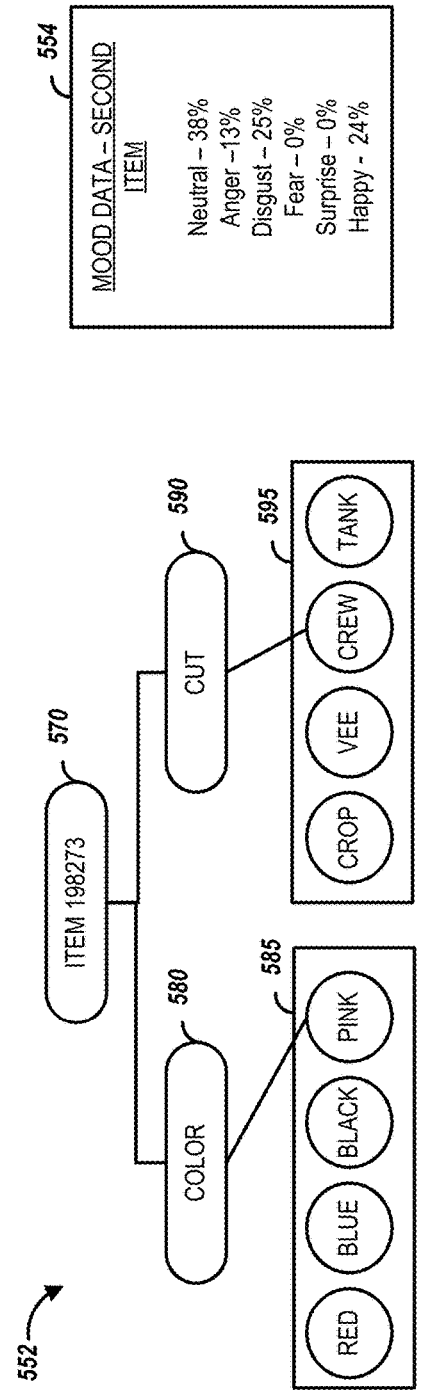
FIG. 5A
FIG. 5B

INDIRECT FEEDBACK SYSTEMS AND METHODS

BACKGROUND

This application generally describes systems, devices, and methods for identifying indirect user feedback and providing mood data or content based on the indirect user feedback. For example, in the context of clothing, the features described may be implemented near a closet or dressing room where a user may be trying on different items. As the user evaluates the item, the user may provide direct feedback, such as to a clerk, identifying items they like or dislike. The user may also provide indirect feedback such as via posture, facial expression, or verbal cues that also include indicia of preference. These indicia may assist a user with wardrobing by offering meaningful preference information to help guide the selection process. Described below are features that offer an improvement in how such indirect feedback is detected and included in providing content to users.

BRIEF DESCRIPTION OF THE DRAWINGS

Embodiments of various inventive features will now be described with reference to the following drawings. Throughout the drawings, the examples shown may re-use reference numbers to indicate correspondence between referenced elements. The drawings are provided to illustrate example embodiments described herein and are not intended to limit the scope of the disclosure.

FIGS. 5A and 5B are pictorial diagrams of example configurations of an item and corresponding indirect feedback detected by the indirect feedback system shown in FIG. 1.

DETAILED DESCRIPTION

Figure 1:
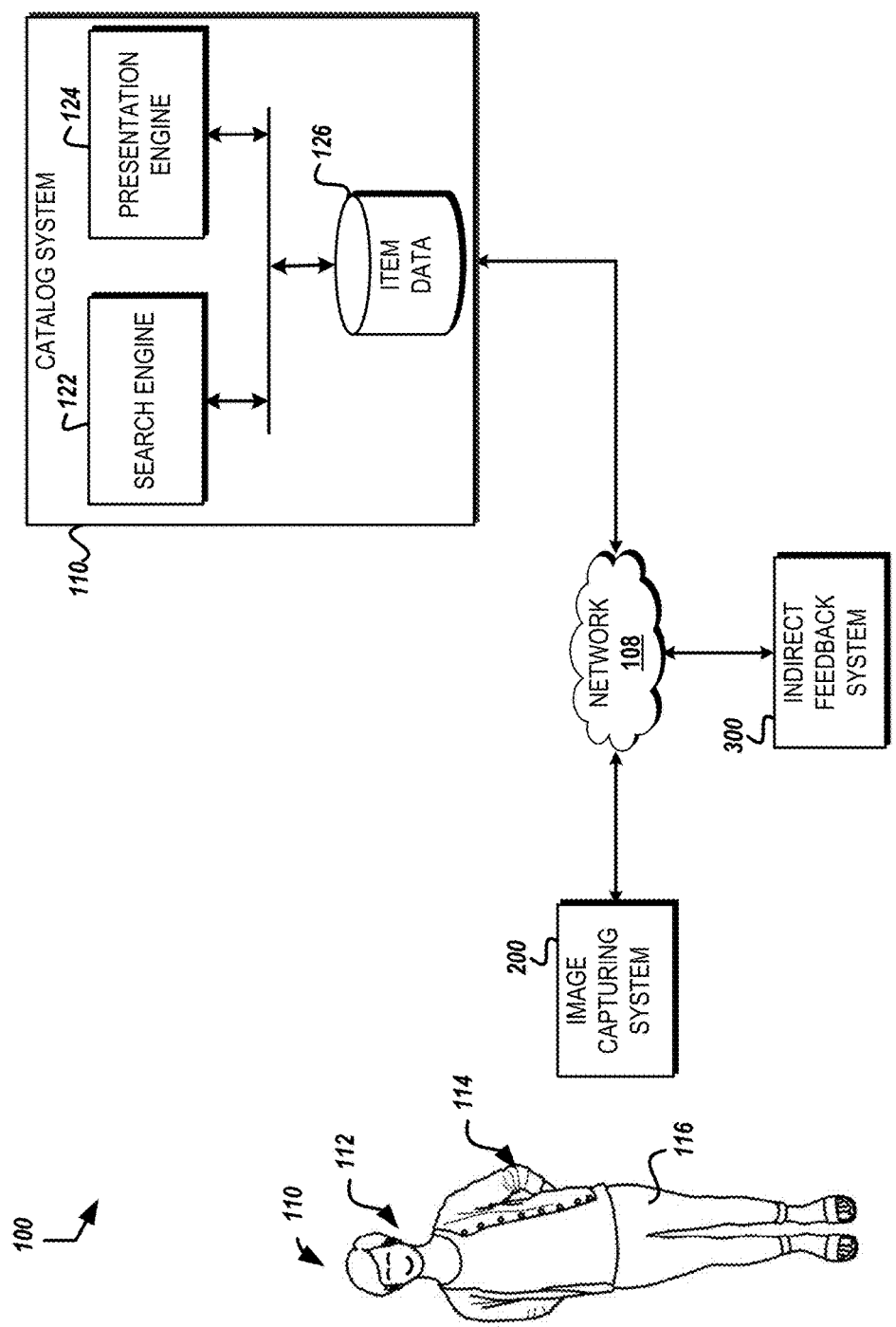
FIG. 1 is a pictorial diagram depicting an illustrative environment in which an indirect feedback system is used to detect indirect feedback, such as mood, of a subject shown in an image captured by an image capturing system and identify items from a catalog based at least in part on the indirect feedback.

An indirect feedback system may be provided that detects indirect feedback, such as mood, of a user shown in a captured image or in captured audio or in other captured data about the user, and identify items from a catalog based at least in part on the indirect feedback. In one embodiment, the indirect feedback system may detect indirect feedback for the user shown or heard in the captured image or in the captured audio. For example, a user's facial expression and/or body language as reflected in a captured image can provide indirect feedback as to the user's mood about an item the user is wearing in the captured image, e.g., how the user is feeling about a shirt the user is wearing in the captured image. This indirect feedback may then be used by the indirect feedback system to identify other items in an item catalog in which the user may also be interested. For example, if the captured image of the user shows the user with a smile and arms held high, it is likely that the user's mood is happy about the item he or she is wearing. As another example, captured audio data representing an utterance of a user can also indicate a user's mood. For example, one or more of the rate, tone, and vocabulary choice for an utterance may convey additional, indirect, meaning above and beyond the actual words included in the utterance. The actual words may constitute direct feedback while the rate, tone, and word choice may provide indirect indicia of the user's mood. For example, the phrase "I feel great" could have a positive meaning if said with emphasis and at a higher rate (e.g., "I FEEL GREAT!") than if said lethargically (e.g., "I . . . feel . . . great.").

To capture images of subject, the indirect feedback system may include an image capturing system having an image sensor configured to capture an image or video (referred to interchangeably herein as an "image") of the subject. The image capturing system may be implemented as a physical booth with a seat to help align the subject in a field of view of the image sensor and, in some cases, lighting controls such as a curtain, ambient lighting, flashes, and the like. Alternatively, the image capturing system may be installed in a fitting room and configured to capture images and other direct and indirect feedback data from a user as he tries on different items. The image captured by the image capturing system can then be provided to the indirect feedback system for assessment to detect indirect feedback, e.g., the user's mood while trying on the item. The indirect feedback data generated can then be used to identify additional items to present for the user, identify user preferences, identify popularity of items, and the like. Indirect feedback may include mood. Mood may generally refer to discrete emotions such as happiness, anger, disgust, fear, surprise, and neutral. Direct feedback, on the other hand, may include explicit audio utterances captured by a microphone such as, "I don't like the color of this shirt," an explicit rating for the item input via a user interface, or an image of the user captured by the image capturing system in which the user is giving a "thumbs down" hand signal in response to a prompt for feedback.

Although the examples and implementations described herein focus, for the purpose of illustration, on using indirect feedback systems to detect indirect feedback, such as mood, of a user shown in a captured image or in captured audio or other captured data about the user and identify items from a catalog based at least in part on the indirect feedback, one skilled in the art will appreciate that the techniques described herein may be applied to other processes, methods, or systems. For example, the techniques may be used with other types of systems that collect and process indirect feedback data for purposes other than identifying items, such as clothing, accessories, home décor, or media, from an item catalog or other data store. Examples of such systems include inventory management systems, user profile aggregation systems, artificial intelligence modeling systems, and the like. Various aspects of the disclosure will now be described with regard to certain examples and embodiments, which are intended to illustrate but not limit the disclosure.

FIG. 1 is a pictorial diagram depicting an illustrative environment 100 in which an indirect feedback system 300 is used to detect indirect feedback, such as mood, of a user shown in an image captured by an image capturing system 200 and identify items from a catalog based at least in part on the indirect feedback. The environment 100 shown in FIG. 1 includes an image capturing system 200. The image capturing system 200 may be configured to obtain images and other data (e.g., audio data, time of capture, lighting at the time of capture, other capture conditions) for a subject such as a user 110. The image capturing system 200 may include an image sensor, such as a camera, for taking images of individuals and a user interface for individuals to provide contact information (e.g., an email address, phone number, etc.). Once an image is captured, the image capturing system 200 may send the image to the indirect feedback system 300 for further analysis and detection of indirect feedback. In this regard, the indirect feedback system 300 may be configured to process the image to automatically identify an item associated with the user, e.g., a clothing item being worn by the subject of the image and detect the mood of the subject from the image. In some implementations, the image capturing device 200 may include mounting hardware to allow the image capturing device 200 to be affixed to a mirror, a door, a window, a dashboard, an appliance, or a computing device. In some implementations, image capturing device 200 may be integrated with another device or system such as an appliance, a video conferencing system, personal computing device, laptop computing device, hand held computing device, terminal computing device, mobile device (e.g., mobile phones or tablet computing devices), wearable device configured with network access and program execution capabilities (e.g., "smart eyewear" or "smart watches"), wireless device, electronic reader, media player, home entertainment system, gaming console, set-top box, television configured with network access and program execution capabilities (e.g., "smart TVs"), or some other electronic device or appliance. The image capturing device 200 may transmit messages to and receive messages from the indirect feedback system 300. The messages may be formatted according to a standardized protocol such as TCP/IP, HTTP, FTP, or the like. The transmission may be sent wired, wireless, or hybrid wired-wireless networks.

For example, a user 110 wearing various clothing items may present herself to the image capturing system 200. As shown in FIG. 1, the user 110 may be wearing an item 116 shown as pants. The user 110 may also be wearing or holding an item such as a bag, a ring, a phone, an umbrella, or another hand-carried accessory. Each of these items combines to form the user's "look." A look generally refers to the collection of items worn or carried together at a given point in time. Each item in the user's look may have a color and/or other configuration attributes, such as tone, texture, material, etc. For example, a hat may be a specific shade of red, while the shoes may be a metallic color with flecking.

A user's response to a look can be judged based on indirect and/or direct feedback. Direct feedback can be obtained by, for example, asking the user to rate a look. However, such direct feedback may have limited effectiveness and does not always capture subtleties in the user's disposition with reference to the look. Thus, indirect feedback can provide a reliable indicator of a user's response to a look.

Indirect feedback can be detected using features shown in an image of the user 110. As shown in FIG. 1, when an image of the user 110 is captured, the user 110 may be exhibiting a facial expression 112 shown as a smile. The user 110 may exhibit a posture 114. Posture generally refers to physical location of one or more parts of the user shown in an image. The posture may be based on, for example, hand location, head location, feet location, elbow location, knee location, hip location, or shoulder location. In some implementations, the posture may identify relative locations between parts of a user. For example, the posture may identify a relative distance and angle between the left shoulder and the right shoulder of a user. As will be described in more detail below, the indirect feedback system 300 can analyze the facial expression and/or posture of the user in the image or other sensed data about the user (e.g., temperature, movement, audio) to detect indirect feedback regarding the clothing items worn by the user. In some implementations, the indirect feedback system 300 may use the indirect feedback to identify other items from a catalog. Such items may, for example, be of more interest to the user.

Over time, the indirect feedback system 300 may store the indirect feedback for different items and identify common item configurations that are associated with positive indirect feedback. This historical indirect feedback may be used to identify item configurations to present to the user. For example, indirect positive feedback may be associated with items having orange color. The historical indirect feedback may be used to identify an order for presenting item configurations to a user. For example, when trying on clothing, contrasting how a user looks in two different item configurations may be important for articulating specific configuration preferences (e.g., color, cut, length, etc.). Accordingly, a first item configuration may be presented for which the user is known, based on previous indirect feedback, to dislike. Then, the new item configuration may be presented. Had the new item configuration been presented first, the user may have had an indifferent reaction. However, when presented in contrast with the first item configuration, the new item configuration may seem more desirable to the user. In this way, the system can identify and direct users to new item configurations.

It may be desirable to capture a set of data for a user. For example, a set of data may be collected while a user is trying on different clothes. The set of data may be associated with a feedback session. During a feedback session multiple elements of feedback data may be collected. For example, it may be desirable to take four images of a user while trying on an item over a period of time. The four images may be individually analyzed for mood and then a composite mood result generated. The set of data for a feedback session may also include audio data or other captured data. Each element in the set of data may be associated with a timestamp. The timestamp allows correlation of two different data elements. For example, an utterance captured at a given time can be compared to an image captured at or near the given time within the feedback session. Any direct or indirect feedback included in the utterance can then be attributed as a response to an item shown in the image.

It may be possible to configure some image capturing systems to detect indirect feedback. However, in some implementations, it may be desirable to augment existing image capturing systems by accessing an indirect feedback system via a network. This can be desirable to conserve resources (e.g., power, processor speed, bandwidth, memory, etc.) at the image capturing system by offloading the analysis and processing related to indirect feedback to another computer device. As shown in FIG. 1, the image of the user 110 may be provided via a network 108 to an indirect feedback system 300. In some implementations, the image capturing system 200 may also be configured to obtain audio data representing utterances of the user 110. The indirect feedback system 300 may be configured to process the image and/or other feedback data captured by the image capturing system 200 to generate feedback data indicating the user's mood.

The image capturing system 200 may also communicate via the network 108 with a catalog system 120. The catalog system 120 may be included to provide a central repository of items that can be accessed by a user. The catalog system 120 may provide functionality for users to, e.g., interactively browse, search for, review, rate, tag, purchase, and sell catalog items such as appliances, electronics, books, clothing, jewelry, and the like. Examples of such systems are described in greater detail, e.g., in U.S. Pat. Nos. 7,685,074; 7,472,077; and 8,122,020, each of which is incorporated herein by reference in its entirety. In some implementations, the catalog system 120 may be implemented as an inventory catalog system used by a merchant to track items for sale. The inventory catalog system may include quantity information for items available, the location of specific items, and the like. In some implementations, the catalog system 120 may be a personal catalog system including items already in the user's wardrobe or closet.

The image capturing system 200 may be configured to request information from the catalog system 120. For example, the image capturing system 200 may submit a query to the catalog system 120. A search engine 122 may process the query to identify additional items or configurations for an item from an item data storage 126. The identification may be a literal identification (e.g., exact match between item data and the item search request). The identification may be a partial match (e.g., words with similar stems or synonyms matching). In some implementations, the search may be executed against an index of the item data store 130.

The catalog system 120 may also include a presentation engine 124. The presentation engine 124 may be configured to present items included in the item data storage 126 based on an item worn by the user 110, such as the first item 116, and/or the mood detected by the indirect feedback system 300.

While the image capturing system 200, the indirect feedback system 300, and the catalog system 120 are shown in FIG. 1 as separate entities configured to communicate via the network 108, in some implementations, it may be desirable to integrate two or more of the systems into a single system. For example, it may be desirable to include the indirect feedback system 300 in the image capturing system 200 or the catalog system 120.

Figure 2:
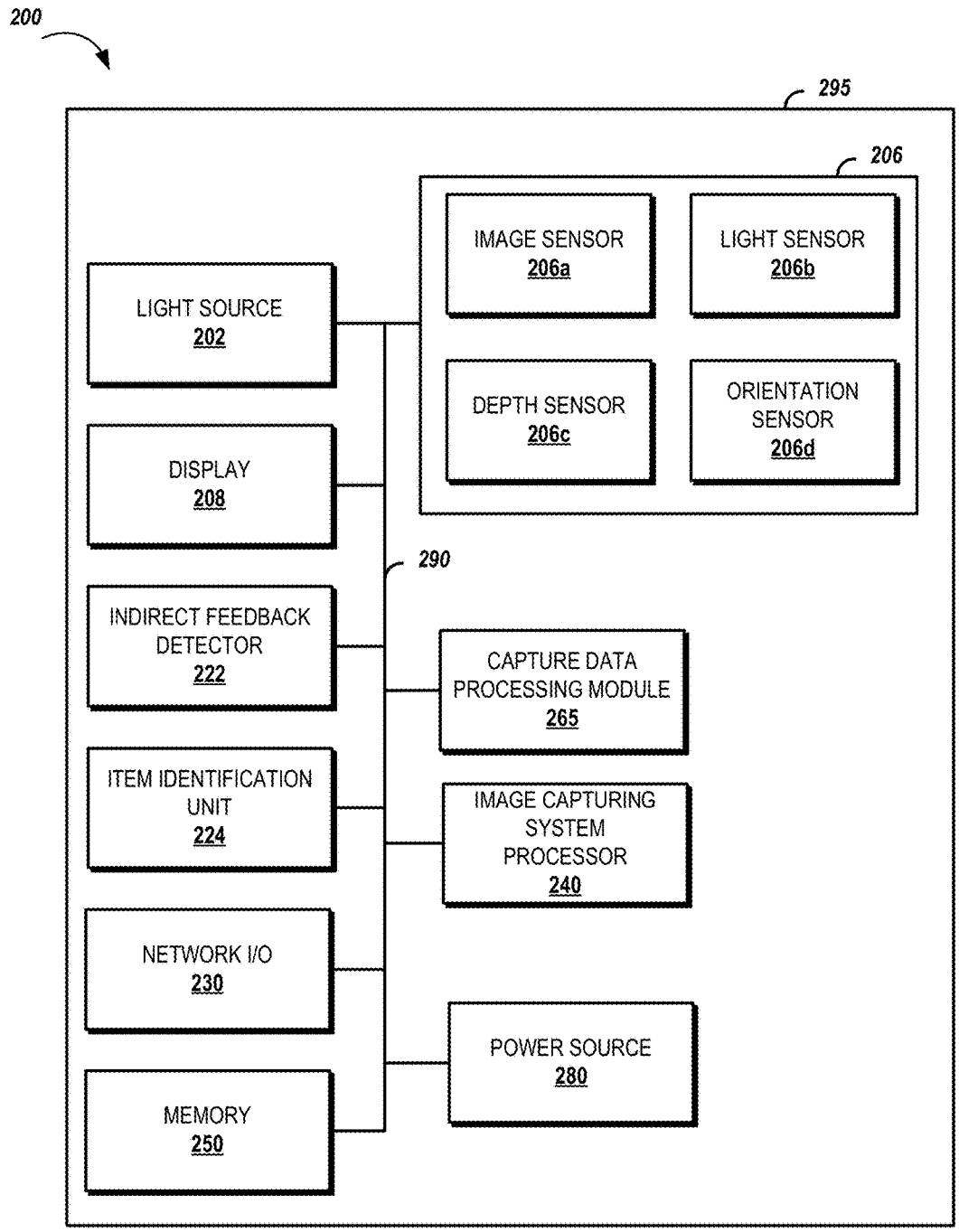
FIG. 2 is a block diagram depicting illustrative components of the embodiment of the image capturing system shown in FIG. 1.

FIG. 2 is a block diagram depicting illustrative components of the embodiment of the image capturing system shown in FIG. 1. The image capturing system 200 shown in FIG. 2 provides a detailed view of one implementation of the structures which may be included in an image capturing system to provide at least some of the described features. The image capturing system 200 shown in FIG. 2 is a simplified example in which extraneous elements have been omitted to focus the reader on the specific features discussed. Additional elements may be added without departing from the intended scope of what constitutes an image capturing system.

In one embodiment, the image capturing system 200 includes a light source 202. The light source 202 may be a single light or an array of lights in communication with the image capturing system 202. In some implementations, the light source 202 may include a rear light source or a top light source mounted to provide light from behind the user or above the user at the image capturing system 200, respectively. In some implementations, the light source 202 may include a bounce flash configured to emit light at the ceiling above the user to provide diffuse illumination.

The light source 202 may be moveable. For example, the light source 202 (or an element included therein) may be mounted on a servo. The servo may be adjusted to control the direction in which the light source 202 shines. In some implementations, individual illuminators included in the light source 202, such as a light emitting diode, may be adjusted.

The light source 202 may be configured to emit light of a certain color. For example, the light source 202 may receive red blue and green values for light to be emitted. The light source 202 may then adjust illuminators included in the light source 202 to provide the requested light color. The light source 202 may be configured to emit light of certain intensity (e.g., brightness). The light source 202 may also be configured to be on or off, where in the on state, the light source 202 is emitting light and in the off state, the light source 202 is not emitting light. The light source 202 may be implemented using one or more of light emitting diodes, prismatic lamps, mirrors, fluorescent bulbs, incandescent bulbs, or other light directing or emitting source.

The image capturing system 200 shown in FIG. 2 includes the display 208. The display 208 may be configured to present graphics, images, and text. The display 208 may be implemented using one or more of a liquid crystal display, a light emitting diode display, a plasma display, a cathode ray tube, or projected light. One example of the display 208 is the VIZIO® E550i-B2 55-Inch 1080p Smart LED HDTV. In some implementations, the display 208 may receive inputs such as via a remote control or a touchscreen interface. The display 208 may be dynamically configured to further influence the captured data. For example, the display 208 may emit light. As such, the display 208 may impact the colors captured in an image taken of a user in front of the display 208. The display 208 may be turned off (e.g., showing no image) during the moment of capture. In some implementations, the display 208 may be used to augment the light such as by showing an image with high brightness at the moment of capture. The display 208 may also include a speaker for presenting audio data.

The image capturing system 200 may also include one or more sensors 206. As shown in FIG. 2, the sensor 206 is implemented as an array of sensors including an image sensor 206a, a light sensor 206b, a depth sensor 206c, and an orientation sensor 206d. The image sensor 206a may be a camera or other electronic component configured to capture still or moving images. The light sensor 206b may be a photodetector or photosensor configured to provide information indicating an amount of light received at the light sensor 206b. The depth sensor 206c may be configured to identify distance of objects from the depth sensor 206c. The depth sensor 206c may be implemented using one or more emitters and one or more cameras. One example of a depth sensor 206c which may be included in the image capturing system 200 is a KINECT® model SKU 74Z-00001 manufactured by Microsoft Corporation of Redmond, Wash. In some implementations, the depth sensor 206c may include a time of flight depth sensor. In yet other implementations, the depth sensor 206c may be configured to detect depth by projecting a pattern of infrared or near-infrared light on an object. The pattern may then be detected and used to generate depth information for the object. The orientation sensor 206d may be included to provide a physical orientation of the image capturing system 200 relative to a reference point. For example, the orientation sensor 206b may be configured to determine the orientation of the image capturing system 200 relative to the ground. This orientation information can be used to adjust a captured image such as by rotating an image captured by the image capturing system 200 that may not be mounted perpendicular to the ground.

Other examples of sensors which may be included in the array of the image capturing system 200 include a thermometer, a barometer, a microphone, a humidity sensor, a scale, a scale, an accelerometer, or another sensor configured to provide context to the data captured. In some implementations, the sensor may be configured to collect additional information about a user. For example, a scale may be integrated into a pad included in the image capturing system 200. The pad may be placed in a space that will be imaged by a camera of the image capturing system 200. The scale may provide weight information about user who is about to be captured as the user stands on the pad. Similarly, a thermal scanner may be included in the image capturing system 200. The thermal scanner, such as an infrared camera, may detect skin temperature of a user. The skin temperature may be captured as a user is trying on different items. A skin temperature reading can be matched (such as by using time stamps of when the respective captures occurred) with an image showing the user wearing a particular outfit. The temperature or changes thereof can be used to infer mood. For example, if the user is angry or frustrated, the detected temperature may be higher than when the user is happy or calm. A sensor to detect the size and/or location of a user's iris or other body part (e.g., nostril, lips, and eyebrows) may be included. In some implementations, the size or location of the iris or other body part may be detected via pixel analysis of image data of the user captured by a camera included in the image capturing system 200. In the example of iris data, if the iris increases in size at a time when the user is trying on a particular outfit, the mood of the user may be positive while a smaller diameter of the iris may be associated with negative mood. The example shown in FIG. 2 includes one sensor of each type. In some implementations, it may be desirable to include more than one sensor of a given type, such as multiple light sensors 206b.

An image capturing system processor 240 may be included to coordinate the functions of the image capturing system 200. For example, the image capturing system processor 240 may be configured to initiate capture sessions and/or coordinate the sensors 206 to capture data (e.g., for a feedback session).

The image capturing system 200 may include an indirect feedback detector 222. The indirect feedback detector 222 may be configured to identify data collected by the one or more sensors 206 suitable for detecting indirect feedback and obtain a feedback response (e.g., mood data or items to present). For example, the indirect feedback detector 222 may receive a message indicating that data was collected by the one or more sensors 206. The indirect feedback detector 222 may then access the data to determine whether indirect feedback can be detected using the data. The indirect feedback detector 222 may be dynamically configured to assess the suitability of the data for detecting indirect feedback based on the type (e.g., image, audio, text, biometrics, or video) of data collected. In some implementations, if the data is image data, the indirect feedback detector 222 may be configured to determine whether an image included in the image data shows features which can be used for detecting indirect feedback. For example, in a clothing implementation, an image may be captured that does not include a human face. Using computer vision detection, such as color histogram analysis of the pixels included in the image, the indirect feedback detector 222 may determine that the image does not include the necessary information for detecting mood based on facial expressions. As another example, the image may be blurry or have poor color (e.g., due to low light level). Using image analysis, the brightness, contrast, clarity, and/or similar image quality metrics of the image may be determined. The determined image quality metric may then be compared to a threshold defining a suitable level of the metric for generating indirect feedback. If the comparison indicates the metrics of interest are suitable for detecting indirect feedback, the indirect feedback detector 222 may provide the image to obtain a feedback response.

The indirect feedback detector 222 may receive audio data from the one or more sensors 206. The audio data may include representations of utterances from one or more users. The indirect feedback detector 222 may be configured to determine whether a portion of audio data can be used for to detect indirect feedback. The determination may include analyzing the quality of the audio data (e.g., volume, noise, sample rate, etc.) and comparing the quality to one or more audio quality thresholds indicating a suitable level for the audio data for detecting indirect feedback and generating a feedback response based thereon.

The image capturing system 200 may include an item identification unit 224. The item identification unit 224 may be configured to identify an item or configuration for an item present near the image capturing system 200. For example, in a clothing implementation, the item identification unit 224 may be configured to identify an item or configuration for an item a user brings into a dressing room. The item identification unit 224 may use image data captured by the one or more sensors 206 to identify the item or item configuration. The image data can be analyzed using pixel-based object recognition to determine the item or item configuration included in the image data. For example, the color of an item may be identified. As another example, the item may include a physical tag that is captured in the image data. Optical character recognition may be used to read the physical tag and provide an indication of the item and/or item configuration. In some implementations, the physical tag may include a bar code or other machine readable identifier for the item. This machine readable identifier may be captured in the image and used to identify the item or configuration thereof.

The item identification unit 224 may use a wireless sensor such as a radio-frequency identifier tag attached to an item to identify the item or item configuration. In such implementations, as the tag is carried into the detection field, identifying information included in a radio frequency signal can be sensed by the wireless sensor. The identifying information may include an item number or stock keeping unit number. Using the identifying information, the specific configuration for the item can be obtained such as from an inventory data store. The item identification unit 224 may be used in implementations where the feedback response includes mood data. In such implementations, rather than rely on the indirect feedback system 300 to identify items to present, the image capturing system 200 or operator thereof may implement a custom presentation engine, preference tracking, loyalty program, or other system based on detected items and mood data for users.

The image capturing system 200 shown in FIG. 2 includes a network input/output interface ("network I/O") 230. The network I/O 230 is configured to transmit and receive communications via a network such as the Internet, a local area network, a wide area network, a peer-to-peer network, a cellular network, a satellite network, a public switched telephone network, any combination thereof, or other communication system for exchanging data between electronic devices. In one implementation, the network I/O 230 is configured to provide capture data such as indirect feedback data and receive a feedback response to the indirect feedback, as will be described in further detail below.

The image capturing system 200 shown in FIG. 2 also includes a capture data processing module 265. The capture data processing module 265 may be configured to manipulate data captured by the sensors 206. For example, the capture data processing module 265 may be configured to process images captured by the image sensor 206*a*. Some image sensors 206*a* may be limited in the range of configurations possible. As such, processing of the data captured by the image sensor 206*a* may be desirable. The capture data processing module 265 may receive the captured image along with configuration information from the sensor configuration module 260 indicating the desired capture data format and characteristics. If the image sensor 206*a* cannot provide the specified capture data, the capture data processing module 265 may be configured to manipulate the captured data to provide the specified data. For example, the image processing may include one or more of filtering, normalization, perspective correction, color correction, smoothing, or de-noising. In some implementations, the capture data processing module 265 may be configured to generate additional data from the captured information. For example, the capture data processing module 265 may be configured to identify segments within the image and store the segment information as part of the capture data.

The image capturing system 200 includes a power source 280. The power source 280 may include a wired or wireless source of power sufficient to supply operational power to the elements described. In some implementations, the power source 280 may include a battery or other rechargeable source. In some implementations, the power source 280 may include a solar panel array.

The elements of the image capturing system 200 are coupled by a bus 290. The bus 290 is configured to allow the elements to exchange data (such as the messages described herein) and/or power. In some implementations, parallel busses may be included, one for data and one for power.

In some implementations, the image capturing system 200 may include a non-transitory computer-readable memory configured to store executable instructions. The memory 250 may be configured for this purpose. In such a configuration, the image capturing system processor 240 may be in data communication with the computer-readable memory storing the executable instructions. The image capturing system processor 240 may be programmed by the executable instructions to implement the features described.

As noted, the image capturing system 200 shown in FIG. 2 is a simplified image capturing system and other implementations may include additional features. For example, audio output such as a speaker may be included. One or more microphones may be included to capture audio feedback from the user (e.g., utterances or other sounds). A speech processing system may be included. The speech processing system may implement various modules and components for receiving spoken input from a user and determining what the user meant. In some implementations, a speech processing system can include an automatic speech recognition ("ASR") module that receives audio input of a user utterance and generates one or more likely transcriptions of the utterance. ASR modules typically use an acoustic model and a language model. The acoustic model is used to generate hypotheses regarding which words or subword units (e.g., phonemes) correspond to an utterance based on the acoustic features of the utterance. The language model is used to determine which of the hypotheses generated using the acoustic model is the most likely transcription of the utterance based on lexical features of the language in which the utterance is spoken.

The transcription may include direct feedback to a question presented by the image capturing system 200. For example, the image capturing system 200 may ask the user, "What do you think of this?" and then display an image of the user wearing a certain item. The user may respond with a direct statement such as by saying, "I like it." The transcription may also include indirect feedback such as a sigh, gasp, or onomatopoeia. In some implementations, the image capturing system 200 may not ask for direct feedback and simply collect audio data during the feedback session. The audio data may then be correlated, such as by time and/or location, with image data captured by the image capturing system 200. In this way, any indirect feedback included in the audio data can be associated with a particular image. Through the features described, the indirect feedback included in the audio data can be used to determine a user's mood about the particular image.

The image capturing system 200 may include a housing 295 for enclosing all or a portion of the elements included therein. The housing 295 may be used to mount the image capturing system 200 such as in a dressing room at a clothing store or near a closet in a home.

In one implementation, an image capturing system may be implemented with a mirror. In a mirror implementation, the display surface may provide a reflected view of an area in front of the mirror. The image may be a true reflection from a reflected surface or an image displayed based on a camera feed. This implementation provides an unobtrusive means to capture daily images of a user because the user may instinctively look into the mirror as part of a daily routine. In such implementations, the mirror may include a sensor configured to detect the presence of a user (such as by signals emitted from the user's mobile phone, a proximity sensor, etc.) and initiate a capture session as described herein. This provides a convenient and automated way to collect consistent images of a user. Because the sensors may be located behind the display surface, the outward appearance of the mirror will seem to be a "normal" mirror. In some implementations, when a user stands in front of the mirror, the mirror may transform the display from a reflective display to present an interactive display including items for the user to wear based on detected indirect feedback.

Figure 3:
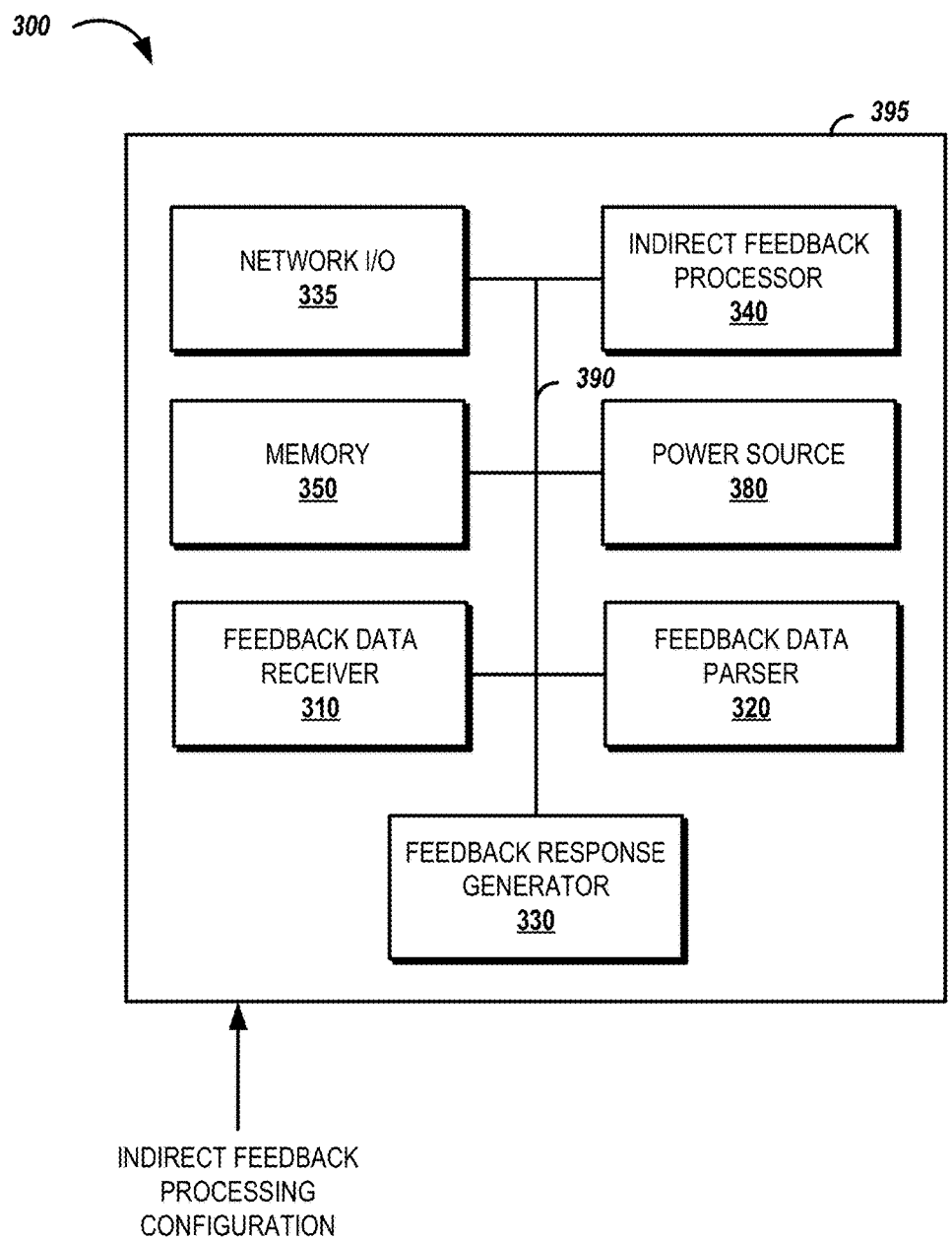
FIG. 3 is a block diagram depicting illustrative components of the embodiment of the indirect feedback system shown in FIG. 1.

FIG. 3 is a block diagram depicting illustrative components of the embodiment of the indirect feedback system shown in FIG. 1. The indirect feedback system 300 shown in FIG. 3 provides a detailed view of one implementation of the structures which may be included in an indirect feedback system to provide at least some of the described features. The indirect feedback system 200 shown in FIG. 3 is a simplified example in which extraneous elements have been omitted to focus the reader on the specific features discussed. Additional elements may be added without departing from the intended scope of what constitutes an indirect feedback system.

The indirect feedback system 300 shown in FIG. 3 includes a network input/output interface ("network I/O") 335. The network I/O 335 is configured to transmit and receive communications via a network such as the Internet, a local area network, a wide area network, a peer-to-peer network, a cellular network, a satellite network, a public switched telephone network, any combination thereof, or other communication system for exchanging data between electronic devices. In one implementation, the network I/O 335 is configured to receive request messages for a feedback response (e.g., items to present or mood data) including indirect feedback data and transmit a feedback response message, as will be described in further detail below.

A message including a request for feedback may be routed to a feedback data receiver 310. The network I/O 335 may provide a physical medium for communicating the data whereas the feedback data receiver 310 provides the logical implementation to identify the type of feedback requested and the feedback data included in the message.

A feedback data parser 320 may also be included to further process the feedback data received. The feedback data parser 320 may be configured to segment an image included in the captured data to identify specific items, configurations, or users shown in the image. In implementations where the captured data includes audio data, the feedback data parser 320 may be configured to identify utterances within the audio data and, in some instances, attribute the utterance to a user or another person.

The indirect feedback system 300 may include a power source 380. The power source 380 may include a wired or wireless source of power sufficient to supply operational power to the elements described. In some implementations, the power source 380 may include a battery or other rechargeable source. In some implementations, the power source 380 may include a solar panel array.

The elements of the indirect feedback system 300 may be coupled by a bus 390. The bus 390 is configured to allow at least some of the elements to exchange data (such as the messages described herein) and/or power. In some implementations, parallel busses may be included, one for data and one for power.

In some implementations, the indirect feedback system 300 may include a memory 370. The memory 370 may be implemented as non-transitory computer-readable memory configured to store executable instructions. The memory 370 may include RAM, ROM, and/or other persistent, non-transitory computer readable media. The memory 370 can store an operating system that provides computer program instructions for use by the indirect feedback processor 340 or other elements included in the indirect feedback system 300 in the general administration and operation of the indirect feedback system 300. The memory 370 can further include computer program instructions and other information for implementing aspects of the present disclosure. In such a configuration, the indirect feedback processor 340 may be in data communication with the computer-readable memory storing the executable instructions. The indirect feedback processor 340 may be programmed by the executable instructions to implement all or a portion of the features described.

The indirect feedback system 300 may include a housing 395 for enclosing all or a portion of the elements included in the indirect feedback system 300. The housing 395 may include mount points to allow the indirect feedback system 300 to be mounted at a location such as within a store, within a dressing room, or within a closet.

The indirect feedback system 300 may include a feedback response generator 330. The feedback response generator 330 may be configured to generate a response to the received indirect feedback data. The response may include mood data. The mood data may be generated using at least a portion of an image. Generating the mood data may include pixel analysis of the portion of the image to identify facial features and/or posture of the user. Using the facial features and/or posture, the mood data can be determined. The determination of mood data from the facial features and/or posture of the user may include processing the facial features and/or posture with a machine learning model configured to provide, as an output, mood data. For example, a machine learning model may be provided that accepts a set of points identified on the face of the user. The points may correspond to the location and shape of the eyes and mouth of the user. Based on the set of points, the machine learning model may provide one or more values corresponding to moods detected for a face associated with the set of points. The machine learning model may be trained using a training data set whereby the emotions for images are manually annotated and the machine learning model is iteratively trained to generate output mood values that match the annotated values. In some implementations, the generation of mood data may include accessing a service such as nViso 3D Facial Imaging commercially available from nViso SA of Switzerland.

In some implementations, the generation of the mood data may include receiving a mood detection model. The mood detection model may be a machine learning model configured to detect mood data using pixel information from an image. For example, the mood detection model may receive a portion of an image showing a user's face or parts of the user's body and the motion thereof. Based on the pixel information included in the portion of the image, the mood detection model may detect mood data for the user shown in the image. The mood detection model may also detect mood from other factors of the users body such as posture (e.g., straight, slouched, leaning forward or backward, tilt of head,), location of body parts (e.g., arms, legs, hips, feet, hands, elbows, shoulders, head, etc.), stance (e.g., facing forward, facing to one side or other, feet focused inward or outward, arms crossed or open, etc.), gestures or some combination of these factors. The mood detection model may additionally derive or detect mood information indirectly through analysis of the user's voice and its qualities such as pitch, loudness, breathiness, harshness, whisperiness, creakiness, rhythm, and tone. The mood detection model may also receive indirect feedback through other means such as kinesics (e.g., body motion signs) or extra linguistic noise or non-linguistic noises. The mood detection may be based on one or more of the methods described in Zeng et al., "A Survey of Affect Recognition Methods: Audio, Visual and Spontaneous Expressions" ICMI'07 (Nov. 12-15, 2007, Nagoya, Aichi, Japan) which is hereby incorporated by reference in its entirety. Additional details on mood detection are described in this application, such as with reference to FIG. 4B.

The response generated by the feedback response generator 330 may include one or more items to present to the user. The image capturing system may process the captured images to identify items worn by the user which, collectively, make an outfit. The identification may be categorical such as "top," "bottom", "shoes," and "accessory." The identification may be of a specific configuration for an item such as "Levi's Men's 505 Regular Fit Jean." The configuration may include color, cut, feature type (e.g., French cuffs, button-fly, pleated front, etc.).

The detected mood along identified item and/or configurations may serve as inputs to identify items to present to the user. For example, a mood model may be provided which strongly associates moods with colors such as blue and pink as well as item types such as pants and shirts. Such a mood model may thus process the item configuration information and mood to identify the suggested alternative configurations that are likely to evoke a desired mood response (e.g., increase the level of happiness, decrease the level of disgust or anger). In one implementation, the mood model may be implemented as a neural network model which accepts as an input vector the item configuration values and mood data and provides as an output one or more item configurations. A mood model may be used to determine what products should be presented to a user based on the likelihood that the user, in the detected mood, will wear or purchase each presented product.

Computing devices can be used to generate models of one or more of the mood and item characteristics. These models can represent data relationships and patterns, such as functions, algorithms, systems, and the like. The models may accept data captured by an image capturing system such as audio data, images or information identified using images, and associated mood data as an input (sometimes referred to as an input vector), and produce an output (sometimes referred to as an output vector) that corresponds to the input in some way. In some implementations, a model is used to generate a likelihood or set of likelihoods that the input corresponds to a particular value, e.g., a score. Different models are used for each individual task and/or application. These models use features specific to each task and/or application. Numerous types of models may be used for these tasks and/or applications. Artificial neural networks ("NN"), including deep neural networks, are one type of model that can be used for modeling these tasks and/or applications. The parameters of a model can be set in a process referred to as training.

A mood model can be trained using data captured by an image capturing system. The data may include input data (e.g., images of users wearing items, audio data, other data sensed by the image capturing system, and indirect feedback) and the correct or preferred output of the model for the corresponding input data. The mood model can be used to process the input data, and the parameters of the model can be modified until the model produces (or "converges" on) the correct or preferred output. Other ways items may be provided include queries of an information storage device including data associating one or more item with one or more other items or item configurations.

In some implementations, the feedback response generator 330 may provide a feedback response intended for someone other than the user. For example, in a clothing implementation, the operator of the store may be interested in customer reactions to items. In such implementations, the mood data may be captured for multiple users and aggregated to generate customer preference information. For example, it may be determined that shoppers at a particular store have a higher detected level of happiness when trying on items in floral prints than when trying on items in a solid color. This information can be used to direct purchasing and also designing future items. For example, a purchasing system may present an inventory management user interface for receiving requests for items from the store. The inventory management user interface may provide an alert when an agent of the store is placing an order based on the indirect feedback customer profile information. For instance, if the indirect feedback indicates a preference for floral prints, when the order includes a first configuration for an item in a floral print in a quantity less than a second configuration for an item in a solid color, the purchasing system may alert the agent. The alert may indicate that the shoppers for that store prefer the floral configuration over the solid color configuration and the ordered amounts are not consistent with these preferences (e.g., the proposed order includes a request for more of the solid configuration than the floral configuration). As placement of items within a store can improve the likelihood that a user will find the items predicted to appeal to the user, the inventory management user interface may also generate a shelf space or rack space allocation plan for the items ordered. For example, a digital map of a store may be maintained. The digital map may include identifiers for the locations (e.g., shelfs and racks) within the store and configurations of items that can be stored at each location (e.g., pants, shirts, dresses, swimwear, etc.). The location may also be associated with a traffic score where a high traffic score location is one that is passed often by a shopper and a lower traffic score location is one that is not frequently passed by a shopper. Upon detecting submission of an order for items, the ordered items may be processed to generate a storage plan for the items according to the digital map and collected indirect feedback such that items with high positive indirect feedback are directed to higher traffic locations than items with lower positive indirect feedback.

In some implementations, the preferences may be used for routing ordered items from a distribution center to respective stores. For example, a central distribution center may receive an allocated number of items of a particular configuration. As the items are routing, such as using an automated sorting machine, the indirect feedback of customers at particular destinations may be used to divide the allocated items. The division may allocate the most number of items to the location having the highest preference. This can ensure that the supply of items is directed to the outlet with consumers most interested in the item.

The indirect feedback system 300 may also receive an indirect feedback processing configuration. The indirect feedback processing configuration allows the indirect feedback system 300 to dynamically adjust how capture data is parsed and processed to generate a feedback response. For example, the indirect feedback processing configuration may identify a presentation engine or a search engine to use for identifying alternative items or item configurations. The indirect feedback processing configuration may identify the location for a service to generate mood data. For example, a web-service may receive an image in a request message and provide mood data in response. Multiple configurations may be specified using the indirect feedback processing configuration. When a feedback request is received, the request may include an identifier indicating the client (e.g., merchant, distributor, etc.) for whom the feedback response will be generated. Using the identifier, the configuration associated with the identifier may be applied to adjust how a given request is processed by the indirect feedback system 300.

Figure 4A:
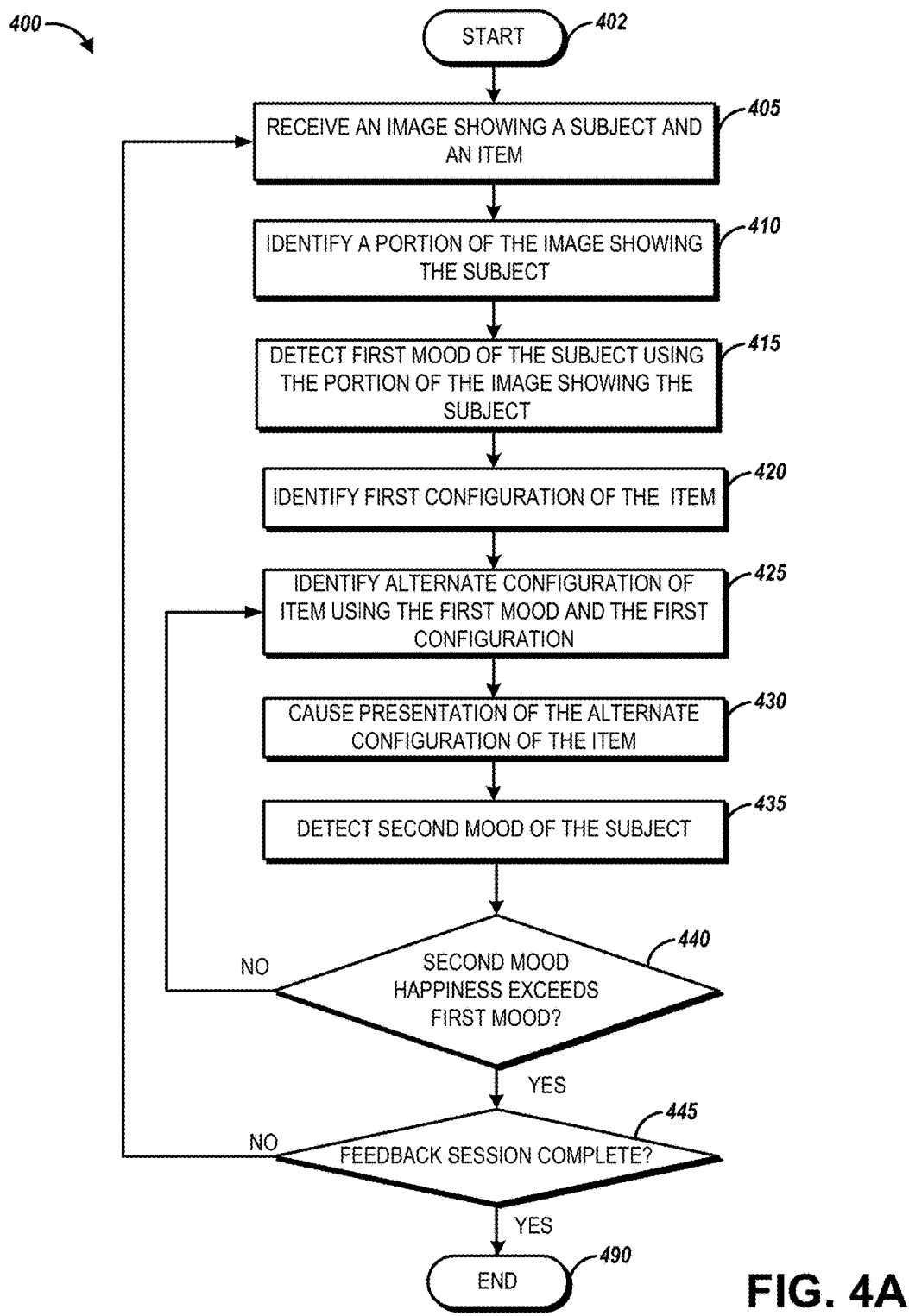
FIG. 4A is a flow diagram depicting an example method of presenting an item identified by the indirect feedback system.

FIG. 4A is a flow diagram depicting an example method of presenting an item identified by the indirect feedback system. The process 400 shown in FIG. 4A illustrates how mood data can be generated from an image, such as an image received from an image capturing system. The process 400 also illustrates how the mood data can be used identify items to present to a user such as via a catalog system. The process 400 shown in FIG. 4A may be implemented in whole or in part by an indirect feedback system such as discussed in FIGS. 1-3 above.

The process 400 begins at block 402. At block 405, an image showing a user and an item is received. The image may be captured by an image capturing system and transmitted to an indirect feedback system. In some implementations, a feedback data receiver of an indirect feedback system may receive the image. The image may be received via a network or other communication channel. The image may be received in one or more messages via wired, wireless, or hybrid wired-wireless communications.

At block 410, a portion of the image showing the user may be identified. In some implementations, the identification of a portion of the image may be referred to as segmenting the image. The segmenting may include pixel analysis of the image to identify an area of the image in which the user is shown. The pixel analysis may identify certain colors, such as skin tones, to locate the user within the image. In some implementations, the pixel analysis may use edge detection to identify shapes of objects shown in the image. Edge detection may include identifying changes in color values between pixels in an image that satisfy a threshold. Using the shape information, the user may be identified. Other or additional computer vision methods may be included to identify the portion showing the user.

At block 415, a mood of the user may be detected. The mood may be detected using the portion of the image showing the user identified at block 410. Detecting the mood may include generating mood data based on pixel analysis of the portion of the image to identify facial features and/or posture of the user. Using the facial features and/or posture, the mood data can be determined. The determination of mood data from the facial features and/or posture of the user may include processing the facial features and/or posture with a machine learning model configured to provide, as an output, mood data. For example, a machine learning model may be provided that accepts a set of points identified on the face of the user. The points may correspond to the location and shape of the eyes and mouth of the user. Based on the set of points, the machine learning model may provide one or more values corresponding to moods detected for a face associated with the set of points. The machine learning model may be trained using a training data set whereby the emotions for images are manually annotated and the machine learning model is iteratively trained to generate output mood values that match the annotated values. In some implementations, the generation of mood data may include accessing a service such as nViso 3D Facial Imaging commercially available from nViso SA of Switzerland. The mood of the user can then be detected based on the mood data. For example, the mood data may indicate a level happiness shown in the image. If the level corresponds to a happiness threshold, the user's mood may be detected as happy. In addition or in the alternative, the skin tone of the user may be identified. The skin tone may be associated with a particular mood. For example, if the skin tone includes reddish hues, the user may be blushing or excited. If the skin tone includes more neutral tone (e.g., paleness) the user may be less excited or upset.

In some implementations, the mood may be detected using audio data. For example, acoustic metrics for the audio data indicating acoustic properties such as rate, volume, and/or tone, may be analyzed. One or more of these acoustic metrics may be used to detect a mood of the user. For example, where the acoustic metrics indicate arousal (e.g., heightened volume and/or rate), happiness may be inferred. An acoustic metric may be compared to a range of values where audio within the range is associated with a mood (e.g., loudness metric of 60-65 decibels may be correlated with happiness). The indirect feedback may also be detected in audio data using speech recognition. For example, the audio data may represent utterances of a user. The utterances include words that can be detected using speech recognition to generate a transcript of the utterance. A lexical analysis of the words included in the transcript can be used to further detect the mood of the user who uttered the words. For example, words like "great," "exhilarating," "sun," "good," and "life" may be associated with happiness. In contrast, words like "die," "bad," and "darkness" may be associated with sadness. The lexical analysis may include comparing the transcript to a set of words associated with different moods. For example, by tallying the number of words associated with each mood, the mood of the user may be detected. In some implementations, the transcript may be provided for more robust lexical analysis, such as lexical semantic analysis, to detect mood based on the words and groupings of words in the transcript.

In some implementations, biometric data may be collected by a sensor included in the image capturing system 200. The biometric data may indicate biological information about a user such as heart rate, breathing rate, skin temperature, or distribution of weight between a user's feet. The biometric data may be correlated with a mood. For example, increased heart rate, breathing rate, or skin temperature may indicate elevated level of excitement for a user. A level of one or more of these factors may be correlated with positive feedback. In some implementations, there may be a threshold above which the elevated level of, for example, heart rate, indicates the excitement is a manifestation of agitation or anger. In some implementations, biometric data from one or more sensors is received and combined to generate a mood based on the collected biometric data.

In some implementations, the mood may be determined using a combination of one or more of the types of data described (e.g., image, audio, biometric, etc.). For example, a composite mood may be determined based on the respective moods detected for the available data types. Equation (1) below shows one expression of how a composite mood value can be determined from discrete mood scores generated using specific data types.

$$\text{mood}_{composite} = \frac{\sum_{i=0}^{n} w_i(m_i)}{n} \quad \text{Equation (1)}$$

where: n is the number of data types available,
w is a weight for a given (i) data type, and
m is a mood score for the given (i) data type.

Figure 4B:
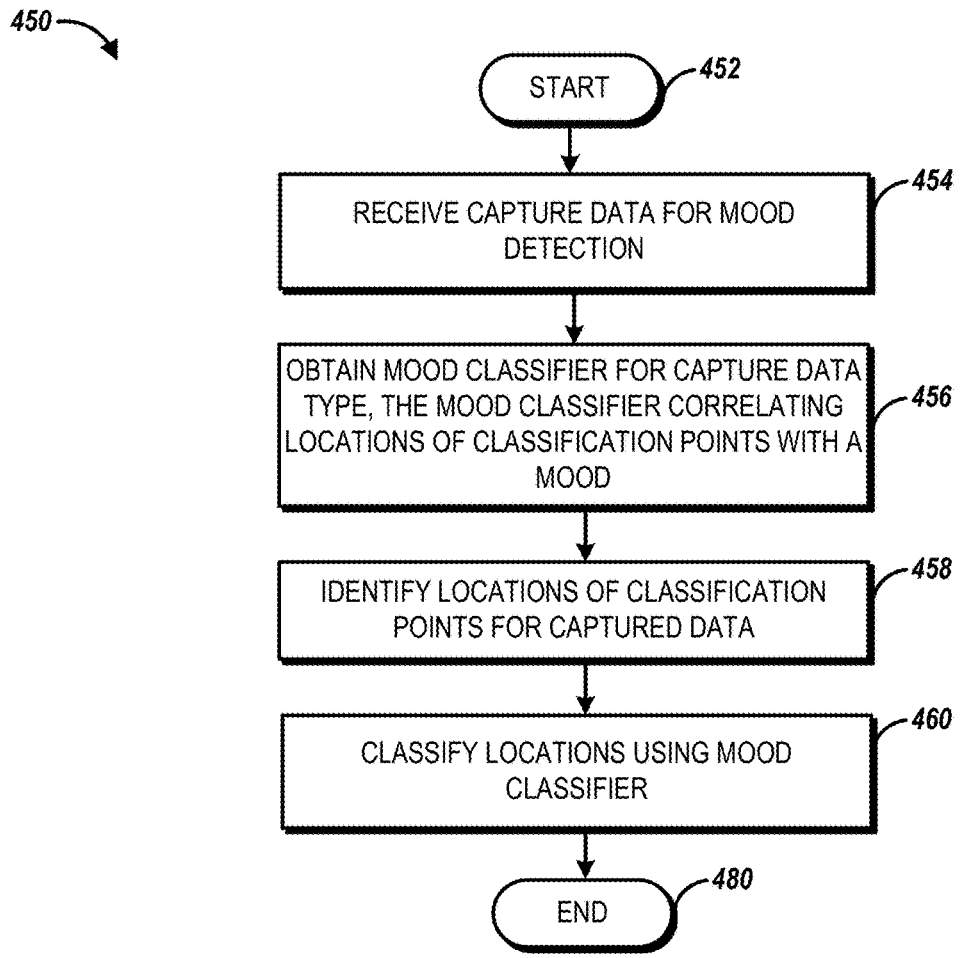
FIG. 4B is a flow diagram depicting an example method of detecting indirect feedback, such as mood.

FIG. 4B is a flow diagram depicting an example method of detecting indirect feedback, such as mood. The detection of mood at block 415 of FIG. 4A may include the features of the process 450 shown in FIG. 4B. The process 450 shown in FIG. 4A may be implemented in whole or in part by an indirect feedback system such as discussed in FIGS. 1-3 above.

The process 450 begins at block 452. At block 454, capture data is received for mood detection. The capture data may include different types of data such as audio, image, video, or biometric data. The capture data may be received from an image capturing system or a sensor coupled therewith.

At block 456, a mood classifier is obtained for classifying the mood indicated by the type of capture data. For example, if the type of the capture data is audio data, a first classifier correlating audio waveform patterns and/or linguistic constructs (e.g., word choice, sentence structure, etc.) with moods may be obtained. If the type of the capture data is image data, a second classifier correlating facial and/or posture with moods may be obtained. The classifiers may indicate locations that may be used to identify the mood. For example, for image capture data, the classifier may accept locations of the corners of a user's the mouth and their eyes as input values. The positioning of these four points (e.g., distance and/or angle between the points) may then be correlated with one or more moods. In some implementations, the number of locations may be fewer (e.g., one, two, or three) or greater (e.g., 10, 30, or 100). The number of location may also be based on the available resources of the device detecting the mood. For example, if the device is operating in an environment with abundant resources (e.g., power, processor time, memory, etc.), it may be desirable to increase the number of locations used to detect the mood. Conversely, if the device is operating in a constrained resource environment, it may be desirable to conserve resources that would be spent on a detailed mood detection and limit the number of locations analyzed. The number of locations may be specified using a configuration threshold that can be dynamically assessed by the device detecting the mood.

For captured biometric data, the locations may refer to specific biometric readings or locations within a graph of the data captured over a period of time (e.g., heart rate monitor, breathing rate, temperature, etc.). For capture video data, the locations may be similar to the locations described for image data. However, for video data, the classifier may also identify locations within the video stream (e.g., one or more frames) to use for mood detection.

At block 458, the locations that will be used for detecting the mood as specified in the mood classifier may be identified in the capture data. For image data, the locations may be identified using pixel analysis of the captured image data. For audio data, the locations may be identified using waveform analysis of the captured audio data and/or automatic speech recognition transcripts of the captured audio data. For biometric data, the locations may be identified using time or pixel analysis of the biometric data.

At block 460, using the information at the classified locations, the mood may be detected. The location information or derivations thereof (e.g., composite, average, etc.) may be compared to the locations identified in the mood classifier. In one implementation, the classifier may identify ranges of locations associated with specific moods. Table 1 below illustrates one example of how image data can be used to detect three example moods based on the location of the two sides of a user's mouth.

TABLE 1

| Distance Between Points | Angle Between Points | Mood |
|---|---|---|
| 10-22 | 0-10 | Surprise |
| 20-40 | 0-10 | Neutral |
| 20-40 | 11-19 | Disgust |

The process 450 ends at block 480. In some implementations, the process 450 may be repeated for additional captured data or to process another channel of captured data. For example, video data may include images and audio which may be processed as separate channels using different classifiers. In such implementations, the process 450 may include combining the results of the individual channels to arrive at a final detection results. The combination may include averaging mood scores generated for each channel to provide a final mood score. Equation (1) above is one expression of how the mood data from different channels may be combined.

Returning to FIG. 4A, at block 420, a first configuration for the item is identified using the image. The configuration may identify attributes of the item such as color, cut, manufacturer, etc. The attributes may be similar to those shown in FIG. 5A or 5B. The identification of the attributes may be based on additional computer vision analysis of the image. For example, the specific items worn by the user may be extracted using image processing features described in U.S. patent application Ser. No. 14/729,894 entitled "PIXEL-STRUCTURAL REFERENCE IMAGE FEATURE EXTRACTION," that is commonly owned by Applicant and the entirety of which is incorporated by reference.

FIGS. 5A and 5B are pictorial diagrams of example configurations of an item and corresponding indirect feedback detected by the indirect feedback system shown in FIG. 1. FIG. 5A shows a first configuration 502 of an item. The first configuration 502 is provided as a hierarchical representation for the item. The first configuration 502 includes a root node 570 representing the item. As shown in FIGS. 5A and 5B, the root node 570 may include an identifier for the item such as a numerical identifier. In some implementations, the configurations may refer to different items (e.g., an Acme Co. shirt and a Super Inc. shirt). In such implementations, the configurations for the item may differ based on the manufacturer.

Logically associated with the root node 570 may be one or more attribute nodes. As shown in FIGS. 5A and 5B, two attribute nodes, color attribute node 580 and cut attribute node 590 are associated with the root node 570. An attribute node may be associated with one or more possible values. The values indicate the specific value for the attribute node. For example, the color attribute node 580 is associated with a set of color attribute values 585. The value identified for the color attribute node 580 of an instance of the item indicates the color of the item in the specified configuration. The cut attribute node 590 is associated with a set of cut attribute values 595. The value identified for the cut attribute node 590 of an instance of the item indicates the cut of the item in the specified configuration. As shown in FIG. 5A, the color for the first configuration 502 of the item is blue and the cut is crew (e.g., crew-neck).

Associated with a configuration of the item may be a first set of mood data 504. The first set of mood data 504 for the first item indicates levels of various emotions detected in an image of the user in which the user is wearing or otherwise viewing the item in a first configuration. As shown in FIGS. 5A and 5B, mood data is provided as percentages over six emotions. It will be appreciated that other representations of mood data may be provided. For example, a single prevailing mood may be identified. In some implementations, fewer or additional emotions may be identified. In some implementations, the emotions may be associated with integer or floating point values indicating levels of the associated emotion as compared to the other emotions detected.

In FIG. 5B, a second configuration 552 for an item is shown. The second configuration 552 indicates an alternate configuration of the item having pink color and crew cut. In generating a feedback response, it may be desirable to alter an attribute and detect mood. In this way, the affect a discrete attribute has on the user can be detected. By comparing the first set of mood data 504 with a second set of mood data 554 for the second item, it can be determined that the pink version of the item shown in FIG. 5B is less desirable than the blue version in FIG. 5A. For example, the anger and disgust detected in the second set of mood data 554 is higher than that of the first set of mood data 504. Furthermore, the level of happy detected in the second set of mood data 554 is lower than the level of happy detected in the first set of mood data 504.

Using these mood comparisons, attributes for a given node can be adjusted to determine attributes preferred by a user. The comparisons may be stored and used to manage future inventory decisions. For example, it may be determined that pink is disliked by many users irrespective of the cut. In such instances, the inventory system may be configured to adjust requests for products to keep a lower inventory of pink as opposed to other colors.

Returning to FIG. 4A, at block 425, an alternate configuration for the item may be identified using the mood data and the first configuration. In some implementations, available configurations may be selected based on available inventory. For example, where the system supports a physical location, the inventory of items available at the physical location may be limited. As such, it may be desirable to provide alternative configurations that are available at the same physical location as the item. In an implementation at a clothing store, the item in the first configuration may be shown in the image with a color characteristic of blue and the cut characteristic of V-neck. The inventory system may determine that the only cut available at the store is V-neck. In such instances, the attribute that can be used to make a same-store suggestion would be the color.

The alternate configuration for the item may be identified using a catalog system. For example, a search request may be transmitted to the catalog system. The search request may include criteria to identify an alternate configuration for the item. For example, if the first configuration is for a blue, long sleeved shirt manufactured by Acme Co., the first configuration may include the attributes of color, cut, and manufacturer. The search request may include criteria for long sleeved shirts manufactured by Acme Co. that are green. If an item having this configuration is identified, the effect of color on a user's mood can be gauged by comparing the first mood data from block 415 with second mood data for the user.

In some implementations, the alternate configuration may be identified so as to improve the mood of the user. For example, the catalog system may include items owned by the user. These items may be associated with previously detected moods. For example, when a user wears a specific shirt, her mood may be detected as happy. This specific shirt may be provided as an alternate configuration to improve the mood of the user over the initial configuration.

At block 430, an image of the alternate configuration is displayed. The image may be presented via a display included in the image capturing system or another access device such as a mobile phone or tablet computer.

At block 435, a second mood of the user is detected. The second mood may be detected in a manner similar to the mood detected at block 415 and shown in FIG. 4B. However, the second mood is detected using data captured after the display of the alternate configuration. This ensures that the underlying data is captured as a reflection of the user's mood in response to the alternate configuration.

Once use for the comparative mood data is to determine whether the alternative configuration is preferred by the user. At block 440, a determination as to whether the second mood indicates an improvement over the first mood. As shown in FIG. 4A, the improvement may be determined when a happiness level identified in the second mood exceeds the happiness level indicated in the first mood. The determination at block 440 compares one factor, but multiple or alternate factors may be used. In some implementations, the determination at block 440 may also consider a magnitude of difference between the first mood and the second mood. For example, if the increase in happiness is less than a threshold magnitude, it may not indicate a strong preference for the first configuration or the second configuration.

In the case where the determination at block 440 is negative, the process 400 may return to block 425 to identify an alternate configuration as described above. If the determination at block 440 is affirmative, the process 400 continues to block 445. At block 445, a determination is made as to whether the feedback session is complete. The feedback session may be considered complete when a message indicating termination of the feedback session is received. For example, where a user interface is used to display an image of the second configuration of the item, the user may provide an input indicating he wants to purchase the second configuration. The indication of a transaction can terminate a feedback session. In some implementations, the feedback session may be coupled with the termination of an image capture session. For example, if the image capturing system 200 detects a user leaving an area in which images can be captured, the image capture session may be terminated. This may also cause the termination of the feedback session. In some implementations, a control element may be provided that, upon activation, causes the feedback session to terminate. For example, a user may be shy or otherwise uncomfortable with the collection of data for indirect feedback processing. As such, the user may activate the control element (e.g., physical button or virtual control element on a user interface) to disable collection of data for indirect feedback processing and generation of feedback responses.

If the determination at block 445 is negative, the process 400 returns to block 405. If the determination at block 445 indicates the feedback session is complete, the process 400 ends at block 490.

Figure 6:
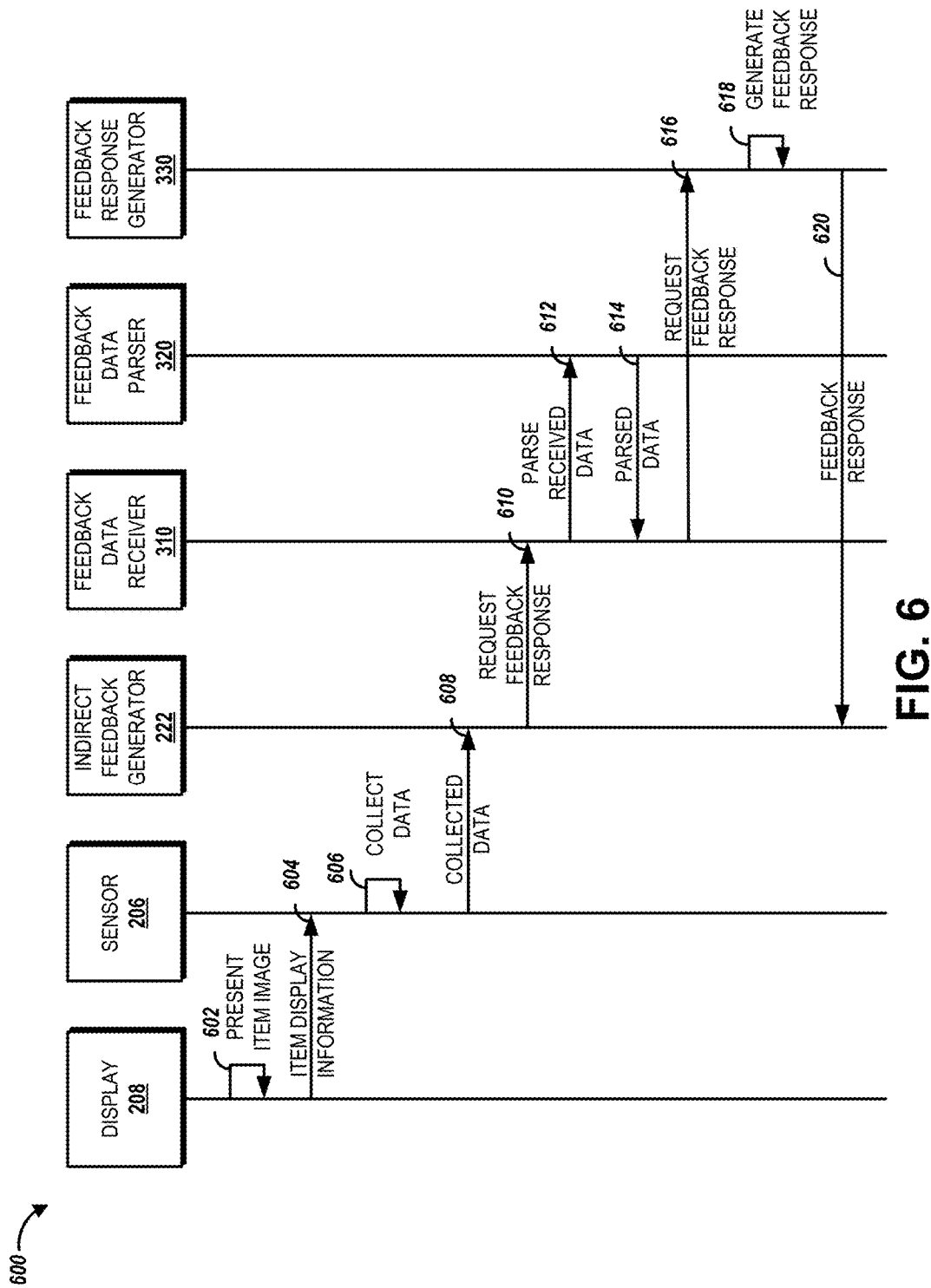
FIG. 6 is a schematic diagram of messages that may be sent between elements of an indirect feedback system during an example feedback session.

FIG. 6 is a schematic diagram of messages that may be sent between elements of an indirect feedback system during an example feedback session. The process 600 shown in FIG. 6 may be used to obtain a feedback response based on captured feedback data such as via an image capturing system installed in a dressing room. The feedback response may include an alternate configuration for an item to present to the user or mood data for the user indicating the user's attitude toward the item and/or shopping experience. The diagram of FIG. 6 shows messages between the display 202, the sensor 206, the indirect feedback generator 222, the feedback data receiver 310, the feedback data parser 320, and the feedback response generator 330 shown in FIGS. 1-3. It will be appreciated that other intermediary elements may be included. For the sake of clarity, these intermediaries have been omitted from FIG. 6 and the description thereof.

Via message 602, the display 208 causes presentation of an image of the item. The presentation may include presenting an item identified via a presentation engine. The presentation may include rendering the image via a user interface viewable by the user. The presentation may be coordinated with the sensor 206 so as to capture feedback data upon display of the image. This can provide data representing the user's initial impression upon viewing the image.

Via message 604, the item display information may be provided to the sensor 206. The item display information may indicate a time when the item is presented. The item display information can be used to indicate which item was presented. This information may be used in the segmentation of the data, such as image segmentation.

Via message 606, the sensor 206 may collect the data. Collecting the data may include activating one or more sensors such as a camera or a microphone. Collecting the data may include searching previously captured data to identify the data captured at or within a range of time from the time when the item was presented.

Via message 608, the data may be provided to the indirect feedback detector 222. The indirect feedback detector 222 may be configured to obtain feedback data using the data collected via message 606. Obtaining the feedback data may include generating a request for a feedback response such as mood data or items based thereon. The request may be transmitted to the feedback data receiver 310 via message 610. The message 610 may include the feedback data captured by the sensor 206. The message 610 may include information identifying the item and/or configuration shown in the feedback data.

Via message 612, a request to parse the received data may be transmitted to the feedback data parser 320. Parsing the received data may include identifying a portion of an image showing the user. Parsing the received data may include processing audio data to identify utterances. In some implementations, the received data may include captured data of the user and another person (see, e.g., FIG. 7 below). Via message 614, the parsed data may be returned to the feedback data receiver 310.

The feedback data receiver 310 may then transmit a request 616 to generate a feedback response to the feedback response generator 330. The request 616 may include all or a portion of the parsed data. The request 616 may include additional information such as the location of the indirect feedback generator 222 requesting the feedback. For example, the location may indicate a specific store where the feedback was collected.

Via message 618, the feedback response may be generated. In some implementations, the feedback response may include detecting the mood. In some implementations, the feedback response may include identifying content or items based on the mood. In some implementations, the feedback response may include an indicator that user mood data was successfully received such as via a ratings system.

Figure 7:
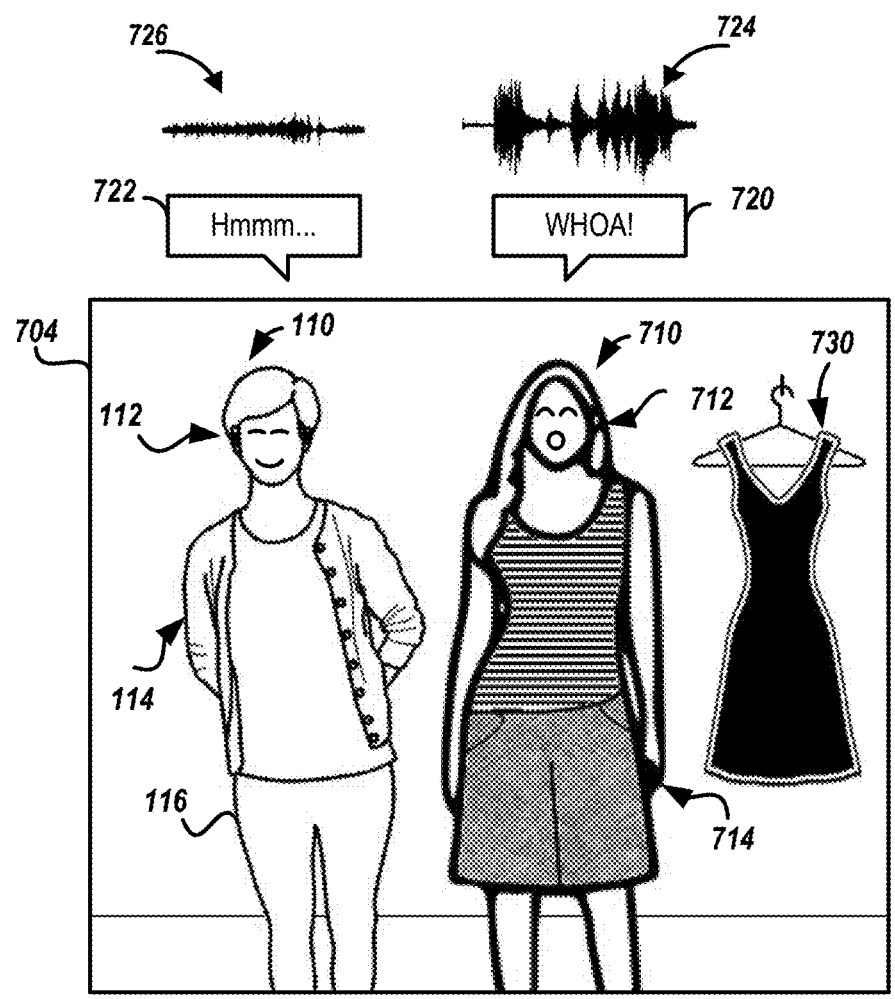
FIG. 7 is a pictorial diagram depicting indirect feedback detected by the indirect feedback system shown in FIG. 1.

Via message 620, the feedback response is transmitted to the indirect feedback generator 222. Depending on the type of feedback response provided, the indirect feedback generator 222 and/or image capturing device in which the indirect feedback generator 222 is implemented may adjust operation. For example, if the feedback response includes an image of the item in an alternative configuration, the image may be displayed. In s FIG. 7 is a pictorial diagram depicting indirect feedback detected by the indirect feedback system shown in FIG. 1. In FIG. 7, an image 704 and first audio data 726 and second audio data 724 are provided as feedback information. The image 704 shows the user 110 and a second person 712. As discussed with reference to FIG. 1, the user 110 may provide indirect feedback via the facial expression 112 and/or posture 114. Similarly, the second person 712 may be captured in a posture 714 and/or with a facial expression 712.

The first audio data 726 may correspond to a first utterance 722 of the user 110. The second audio data 724 may correspond to a second utterance 720 of the second person. In some implementations, the first audio data 726 and the second audio data 724 may be included in a single audio file. In such implementations, the audio file may be parsed such as via the feedback data parser 320.

Additional feedback data may be inferred from other items shown in the image 704. As shown in FIG. 7, an additional item 730 is shown hanging behind the user 110. The additional item 730 may provide preference information such as related to color, cut, pattern, or item type (e.g., skirt, pants, shirt, shorts, etc.).

Returning to FIG. 6, at message 614, the feedback response may be generated. In some implementations, the feedback response generator 330 may provide mood data as the feedback response. In such implementations, the image capturing system receiving the mood data may take further action such as identifying items using the mood data. In some implementations, the feedback response generator 330 may be configured to obtain one or more items from a catalog system and include the items (or information about the items) in the feedback response. The feedback response generator 330 may, in some implementations, maintain state during a feedback session. For example, in a clothing implementation, the user may try on different items. As feedback data is received during the feedback session, the feedback response generator 330 may store item information, feedback therefor, and feedback response provided for one or more of the items.

Via message 620, the feedback response is provided to the indirect feedback detector 222. The indirect feedback detector 222 (or the image capturing device in which the indirect feedback detector 222 is included) may take further action. For example, if an item (e.g., an item in an alternate configuration) is provided in the message 620, the indirect feedback detector 222 may cause the display 208 to present an image of the item. In such implementations, the process 600 may be repeated to collect data for the presented item and generate a feedback response based on the collected data, and in some implementations, the previously received data for the first item.

In some implementations, it may be desirable to track mood over time and generate a response based on a set of collected mood data. For example, at a first time indirect feedback for a first configuration of an item may be collected and used to generate first mood data. At another time, either during the same feedback session or a subsequent feedback session, second indirect feedback for the first configuration may be collected. The second indirect feedback may be used to generate second mood data. The second mood data may be more relevant to a user's attitude than the first mood data because it is more recent. However, the first mood data may still inform the user's attitude and how the attitude is trending. For example, a time difference between the time that the image was captured and the second time that the additional image was captured. A weighted detected mood can be generated using the additional mood data and the time difference. Thus, rather than relying only on the first or the second mood data, both can be considered with preference given to the more recent mood data (e.g., second mood data) than the older mood data (e.g., first mood data). The weighted mood data may then be used for generating the feedback response as discussed above.

Figure 8:
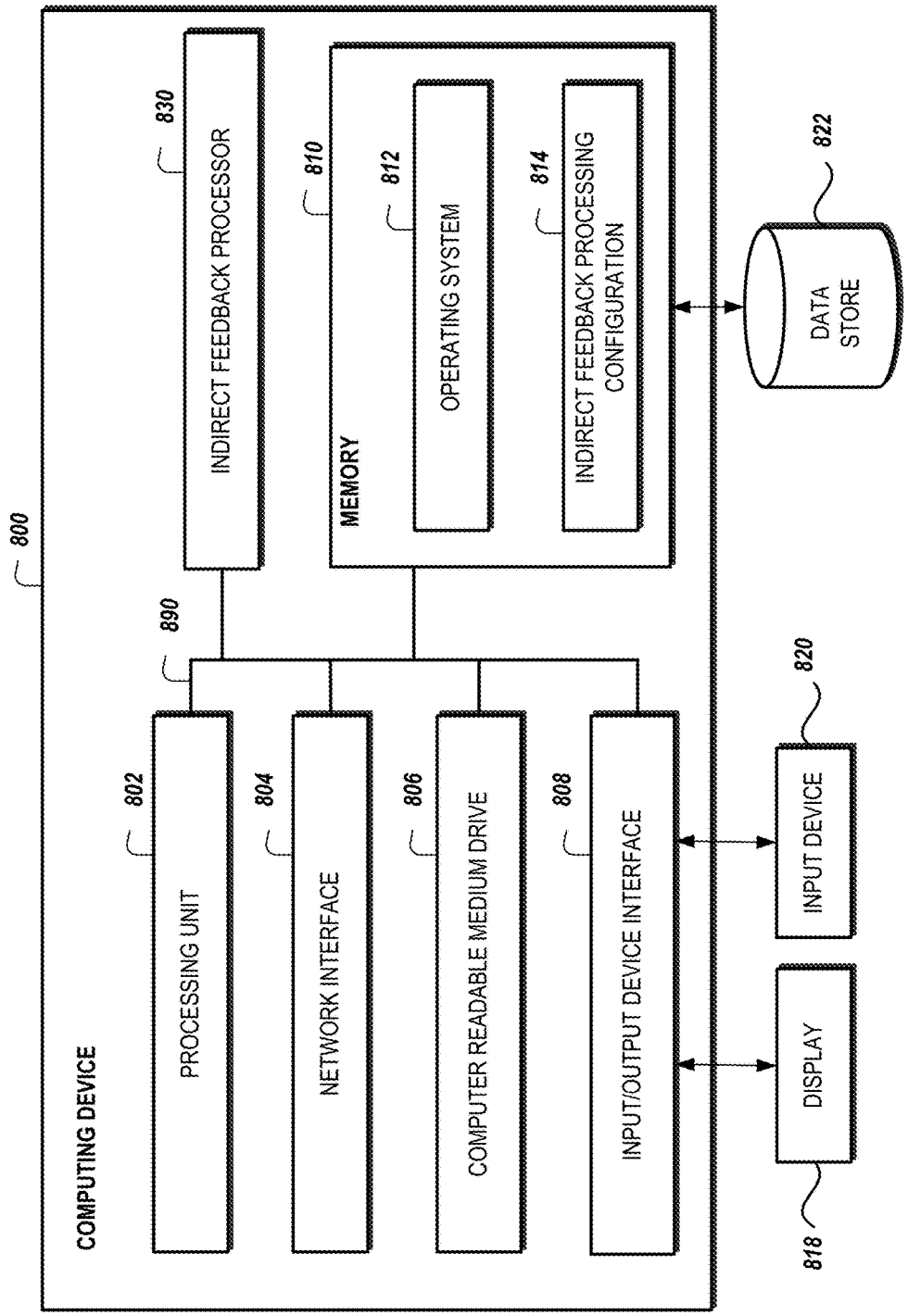
FIG. 8 is a block diagram depicting an illustrative computing device that can generate indirect feedback.

FIG. 8 is a block diagram depicting an illustrative computing device that can generate indirect feedback. The computing device 800 can be a server or other computing device, and can comprise a processing unit 802, an indirect feedback processor 830, a network interface 804, a computer readable medium drive 806, an input/output device interface 808, and a memory 810. The network interface 804 can provide connectivity to one or more networks or computing systems. The processing unit 802 can receive information and instructions from other computing systems or services via the network interface 804. The network interface 804 can also store data directly to memory 810. The processing unit 802 can communicate to and from memory 810 and output information to an optional display 818 via the input/output device interface 808. The input/output device interface 808 can also accept input from the optional input device 820, such as a keyboard, mouse, digital pen, microphone, mass storage device, etc.

The memory 810 contains computer program instructions that the processing unit 802 executes in order to implement one or more embodiments. The memory 810 may include RAM, ROM, and/or other persistent, non-transitory computer readable media. The memory 810 can store an operating system 812 that provides computer program instructions for use by the processing unit 802 or other elements included in the computing device in the general administration and operation of the computing device 800. The memory 810 can further include computer program instructions and other information for implementing aspects of the present disclosure.

For example, in one embodiment, the memory 810 includes an indirect feedback processing configuration 814. The indirect feedback processing configuration 814 may include the thresholds, feedback data parsing rules, catalog system location (e.g., URL), presentation engine, automatic speech recognition system, and other configurable parameters to dynamically adjust the indirect feedback processor 830 and/or the computing device 800 to process feedback data and generate feedback responses as described above. The indirect feedback processing configuration 814 may store specific values for a given configuration element. For example, the specific threshold value may be included in the indirect feedback processing configuration 814. The indirect feedback processing configuration 814 may, in some implementations, store information for obtaining specific values for a given configuration element such as from a network location (e.g., URL).

The memory 810 may also include or communicate with one or more auxiliary data stores, such as data store 822. The data store 822 may electronically store data regarding the composite images, extracted images, extraction comparisons for specific item types, authorization verdicts, and the like.

The elements included in the computing device 800 may be coupled by a bus 890. The bus 890 may be a data bus, communication bus, or other bus mechanism to enable the various components of the computing device 800 to exchange information.

In some embodiments, the computing device 800 may include additional or fewer components than are shown in FIG. 8. For example, a computing device 800 may include more than one processing unit 802 and computer readable medium drive 806. In another example, the computing device 802 may not be coupled to a display 818 or an input device 820. In some embodiments, two or more computing devices 800 may together form a computer system for executing features of the present disclosure.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations, or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by an indirect feedback system or other hardware included in an indirect feedback system. The indirect feedback system or other hardware included in an indirect feedback system may include a digital signal processor (DSP), an application specific integrated circuit (ASIC), a field programmable gate array (FPGA), a microprocessor, a controller, microcontroller, or other programmable logic element, discrete gate or transistor logic, discrete hardware components, or any combination thereof. Such indirect feedback systems, devices used to implement the system are specially designed to perform the capturing and processing described herein. An indirect feedback system may include electrical circuitry configured to process specific computer-executable to perform one or more of the features described herein. In embodiments where the indirect feedback system includes a FPGA or similar programmable elements, the indirect feedback system may provide one or more of the features described processing without processing computer-executable instructions but instead by configuring the FPGA or similar programmable element to perform the recited features. Although described herein primarily with respect to digital technology, an indirect feedback system may also include primarily analog components. For example, some or all of the indirect feedback processing features described herein may be implemented in analog circuitry or mixed analog and digital circuitry.

The elements of a method, process, routine, or algorithm described in connection with the embodiments disclosed herein can be embodied directly in indirect feedback system hardware, in a software module executed by a device included in the indirect feedback system, or in a combination of the two. An indirect feedback software module can reside in RAM memory, flash memory, ROM memory, EPROM memory, EEPROM memory, registers, hard disk, a removable disk, a CD-ROM, or similar form of a non-transitory computer-readable storage medium. An exemplary storage medium can be coupled to the indirect feedback system such that the indirect feedback system can read information from, and write information to, the storage medium. In the alternative, the storage medium can be integral to the indirect feedback system. The indirect feedback system and the storage medium can reside in an ASIC. The ASIC can reside in a device configured to capture or process data such as a microphone, a smartphone, a set-top-box, a tablet computer, a desktop computer, or the like. In the alternative, the indirect feedback system and the storage medium can reside as discrete components (e.g., sub-system) in a device configured to capture or process indirect feedback data.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

As used herein, the terms "determine" or "determining" encompass a wide variety of actions. For example, "determining" may include calculating, computing, processing, deriving, generating, obtaining, looking up (e.g., looking up in a table, a database or another data structure), ascertaining and the like via a hardware element without user intervention. Also, "determining" may include receiving (e.g., receiving information), accessing (e.g., accessing data in a memory) and the like via a hardware element without user intervention. Also, "determining" may include resolving, selecting, choosing, establishing, and the like via a hardware element without user intervention.

As used herein, the terms "provide" or "providing" encompass a wide variety of actions. For example, "providing" may include storing a value in a location of a storage device for subsequent retrieval, transmitting a value directly to the recipient via at least one wired or wireless communication medium, transmitting or storing a reference to a value, and the like. "Providing" may also include encoding, decoding, encrypting, decrypting, validating, verifying, and the like via a hardware element.

As used herein, the term "message" encompasses a wide variety of formats for communicating (e.g., transmitting or receiving) information. A message may include a machine readable aggregation of information such as an XML document, fixed field message, comma separated message, or the like. A message may, in some implementations, include a signal utilized to transmit one or more representations of the information. While recited in the singular, it will be understood that a message may be composed, transmitted, stored, received, etc. in multiple parts.

As used herein a "user interface" (also referred to as an interactive user interface, a graphical user interface or a UI) may refer to a network based interface including data fields and/or other controls for receiving input signals or providing electronic information and/or for providing information to the user in response to any received input signals. A UI may be implemented in whole or in part using technologies such as hyper-text mark-up language (HTML), Flash, Java, .net, web services, and rich site summary (RSS). In some implementations, a UI may be included in a stand-alone client (for example, thick client, fat client) configured to communicate (e.g., send or receive data) in accordance with one or more of the aspects described.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

The invention claimed is:
1. A computer-implemented method comprising:
under control of a computing device executing specific computer-executable instructions,
capturing, via an imaging device, an image including a subject;
identifying, using pixel information of pixels included in the image, a portion of the image including the subject;
identifying a facial feature of the subject included in the portion of the image;
detecting a mood of the subject at a time that the image was captured based at least in part on the facial feature;
identifying, using pixel information of pixels included in the portion of the image, a first configuration of an item shown in the portion of the image including the subject;
identifying a second configuration of the item using the mood and the first configuration, wherein the first configuration identifies a first color for the item and the second configuration identifies a second color for the item; and
causing an image of the item in the second configuration to be presented on a display.

2. The computer-implemented method of claim 1, further comprising:
generating additional mood data for the subject using at least a portion of an additional image including the subject, the additional mood data indicating an additional detected mood of the subject at a time that the additional image was captured;
identifying, using pixel information of pixels included in the portion of the additional image, the first configuration of the item shown in the portion of the additional image including the subject;

identifying a time difference between the time that the image was captured and the time that the additional image was captured; and generating a weighted detected mood using the mood, the additional mood data, and the time difference, wherein identifying the second configuration of the item further uses the weighted detected mood.

3. The computer-implemented method of claim 1, wherein identifying the second configuration of the item comprises:

transmitting, to an item data store, a search request for an item associated with the second configuration; and receiving, from the item data store, search results including the second configuration of the item.

4. The computer-implemented method of claim 3, further comprising:

capturing, via the imaging device, a second image including the subject after the presentation of the second configuration of the item;

identifying, using pixel information of pixels included the second image, a portion of the second image including the subject;

identifying a second facial feature of the subject including in the portion of the image;

detecting a second mood of the subject at a time that the second image was captured based at least in part on the second facial feature;

determining the mood indicates a first level of happiness greater than a second level of happiness indicated by the second mood;

identifying a third configuration of the item using the first configuration of the item and the second configuration of the item, wherein the third configuration identifies a third color for the item; and causing an image of the item in the third configuration to be presented on the display.

5. A computer-implemented method comprising:

under control of a computing device executing specific computer-executable instructions, receiving, from a data capture device, data related to an item in a first configuration and a user;

identifying the first configuration of the item;

detecting, from the data related to the item in the first configuration and the user, indirect feedback of the user, wherein the indirect feedback is related to the item in the first configuration;

identifying a second configuration of the item using the indirect feedback and the first configuration of the item, wherein the first configuration of the item is different than the second configuration of the item; and causing an image of the item in the second configuration to be presented on a display.

6. The computer-implemented method of claim 5, wherein the data capture device comprises a microphone and the data related to the item comprises audio data representing an utterance of the user.

7. The computer-implemented method of claim 6, wherein the indirect feedback comprises a mood of the user and wherein the mood of the user is detected from at least one of:

an acoustic property of the audio data; and a word included in the utterance of the user.

8. The computer-implemented method of claim 7, further comprising:

transmitting the audio data to an automatic speech recognition system; and receiving a transcript of the audio data from the automatic speech recognition system, wherein the transcript includes the word.

9. The computer-implemented method of claim 5, wherein the data capture device comprises an imaging device and the data related to the item in the first configuration comprises an image of the user and the item in the first configuration.

10. The computer-implemented method of claim 9, wherein the indirect feedback of the user comprises a mood of the user, and wherein the computer-implemented method further comprises applying a mood detection model to pixel information from the image to detect the mood of the user.

11. The computer-implemented method of claim 9, wherein the indirect feedback of the user comprises a mood of the user, and wherein the mood of the user is detected from at least one of:

a facial expression of the user included in the image; and a posture of the user included in the image.

12. The computer-implemented method of claim 9, wherein the indirect feedback of the user comprises a first mood of the user, and wherein the computer-implemented method further comprises:

receiving another image of the user and the item in the first configuration from the imaging device;

detecting, from the other image of the user and the item in the first configuration, a second mood of the user related to the item in the first configuration;

generating a weighted mood from the first mood and the second mood; and wherein identifying the second configuration of the item further uses the weighted mood.

13. The computer-implemented method of claim 9, wherein:

the indirect feedback of the user comprises a first mood of the user, the image includes another user, the computer-implemented method further comprises detecting a second mood of the other user included in the image, and identifying the second configuration of the item further uses the second mood of the other user included in the image.

14. The computer-implemented method of claim 5, wherein identifying the first configuration of the item comprises:

receiving a first image showing the item in the first configuration;

identifying pixels in the first image showing the item; and identifying the first configuration of the item using the pixels in the first image showing the item.

15. The computer-implemented method of claim 5, wherein identifying the first configuration of the item comprises receiving a radio frequency signal including an identifier for the first configuration of the item.

16. A system comprising:

a data store storing specific computer-executable instructions; and a computing device in communication with the data store, the computing device including a processor that executes the specific computer-executable instructions to cause the system to at least:

receive, from a data capture device, data related to an item in a first configuration and a user;

identify the first configuration of the item;

detect, from the data related to the item in the first configuration and the user, indirect feedback of the user, wherein the indirect feedback is related to the item in the first configuration;

identify a second configuration of the item using the indirect feedback and the first configuration of the item, wherein the first configuration of the item is different than the second configuration of the item; and cause an image of the item in the second configuration to be presented on a display.

17. The system of claim 16, wherein the processor executes specific computer-executable instructions to cause the system to receive the capture data further comprising audio data representing an utterance of the user.

18. The system of claim 17, wherein the indirect feedback comprises a mood of the user and wherein the mood of the user is detected from at least one of:

an acoustic property of the audio data; and a word included in the utterance of the user.

19. The system of claim 17, wherein the processor executes specific computer-executable instructions to cause the system to at least:

transmit the audio data to an automatic speech recognition system; and receive a transcript of the audio data from the automatic speech recognition system, wherein the transcript includes the word.

20. The system of claim 16, wherein the data capture device comprises an imaging device and the data related to the item in the first configuration comprises an image of the user and the item in the first configuration.

21. The system of claim 20, wherein the indirect feedback of the user comprises a mood of the user, and wherein the processor executes the specific computer-executable instructions to apply a mood detection model to pixel information from an image to detect the mood of the user.

22. The system of claim 20, wherein the indirect feedback of the user comprises a mood of the user, and wherein the processor executes specific computer-executable instructions to cause the system to at least detect the mood of the user from at least one of:

a facial expression of the user shown in a portion of the image; and a posture of the user shown in the portion of the image.

23. The system of claim 20, wherein the indirect feedback of the user comprises a first mood of the user, and wherein the processor executes the specific computer-executable instructions to further cause the system to:

receive another image of the user and the item in the first configuration from the imaging device;

detect, from the other image of the user and the item in the first configuration, a second mood of the user related to the item in the first configuration;

generate a weighted mood from the first mood and the second mood; and wherein identifying the second configuration of the item further uses the weighted mood.

24. The system of claim 20, wherein:

the indirect feedback of the user comprises a first mood of the user, the image includes another user, the processor executes the specific computer-executable instructions to further cause the system to detect a second mood of the other user included in the image, and identifying the second configuration of the item further uses the second mood of the other user included in the image.

25. The system of claim 16, wherein the processor executes specific computer-executable instructions to cause the system to at least identify the first configuration of the item by at least:

receiving a first image showing the item in the first configuration;

identifying pixels in the first image showing the item; and identifying the first configuration of the item using the pixels in the first image showing the item.

26. The system of claim 16, wherein the processor executes specific computer-executable instructions to cause the system to at least identify the first configuration of the item by at least receiving a radio frequency signal including an identifier for the first configuration of the item.

* * * * *